US008215278B2

(12) United States Patent
Kummermehr et al.

(10) Patent No.: US 8,215,278 B2
(45) Date of Patent: Jul. 10, 2012

(54) INTERNAL COMBUSTION ENGINE HAVING AN ELASTIC CONNECTOR AND METHOD OF PRODUCING SAME

(75) Inventors: Stefan Kummermehr, Berglen (DE); Stefan Richter, Winnenden (DE); Thomas Techow, Aichwald (DE); Viktoria Schmidt, Bietigheim-Bissingen (DE); Christoph von Hiller, Stuttgart (DE); Ralf Steidinger, Stuttgart (DE); Eberhard Bohnaker, Leutenbach (DE); Manfred Rabis, Schwaikheim (DE)

(73) Assignee: Andreas Stihl AG & Co. KG (DE)

( * ) Notice: Subject to any disclaimer, the term of this patent is extended or adjusted under 35 U.S.C. 154(b) by 666 days.

(21) Appl. No.: 12/360,337

(22) Filed: Jan. 27, 2009

(65) Prior Publication Data
US 2009/0188461 A1 Jul. 30, 2009

(30) Foreign Application Priority Data
Jan. 30, 2008 (DE) .................. 10 2008 006 681

(51) Int. Cl.
*F02M 35/10* (2006.01)
*F02M 23/00* (2006.01)
*F02B 31/00* (2006.01)
(52) U.S. Cl. .................. 123/184.52; 123/306; 123/308; 123/590
(58) Field of Classification Search ............ 123/184.52, 123/184.21, 590, 306, 308
See application file for complete search history.

(56) References Cited

U.S. PATENT DOCUMENTS

| 1,833,711 | A | * | 11/1931 | Goldsborough | 123/276 |
|---|---|---|---|---|---|
| 1,951,812 | A | * | 3/1934 | Smith | 261/79.1 |
| 4,711,225 | A | * | 12/1987 | Holderle et al. | 123/590 |
| 5,915,354 | A | * | 6/1999 | Ma | 123/308 |
| 6,748,921 | B1 | * | 6/2004 | Surges | 123/306 |
| 6,851,407 | B2 | * | 2/2005 | Zimmermann et al. | 123/184.21 |
| 6,868,813 | B2 | * | 3/2005 | Zimmermann et al. | 123/184.46 |
| 6,959,701 | B2 | * | 11/2005 | Zimmermann et al. | 123/590 |
| 7,513,225 | B2 | * | 4/2009 | Geyer et al. | 123/73 A |
| 2005/0045138 | A1 | * | 3/2005 | Schmidt et al. | 123/184.46 |
| 2007/0169764 | A1 | * | 7/2007 | Lo | 123/592 |

FOREIGN PATENT DOCUMENTS
EP    1 221 545    7/2002
* cited by examiner

*Primary Examiner* — Noah Kamen
*Assistant Examiner* — Grant Moubry
(74) *Attorney, Agent, or Firm* — Robert Becker; Robert Becker & Associates

(57) ABSTRACT

An internal combustion engine having a cylinder, a fuel-supply mechanism, and an elastic connector for connecting the fuel supply mechanism to the cylinder. The connector has a first channel for fuel/air mixture and a second channel for combustion air. The connector has a first connection end and a second connection end at which the two channels open out. The two channels are separated from one another by a partition that extends in the longitudinal direction of the channels. The partition is twisted about its longitudinal central axis between the first and second connection ends to achieve a great elasticity of the connector. To produce the elastic connector, a respective core is used for each channel, and the cores are moved relative to one another to enable removal of the connector from a mold.

15 Claims, 8 Drawing Sheets

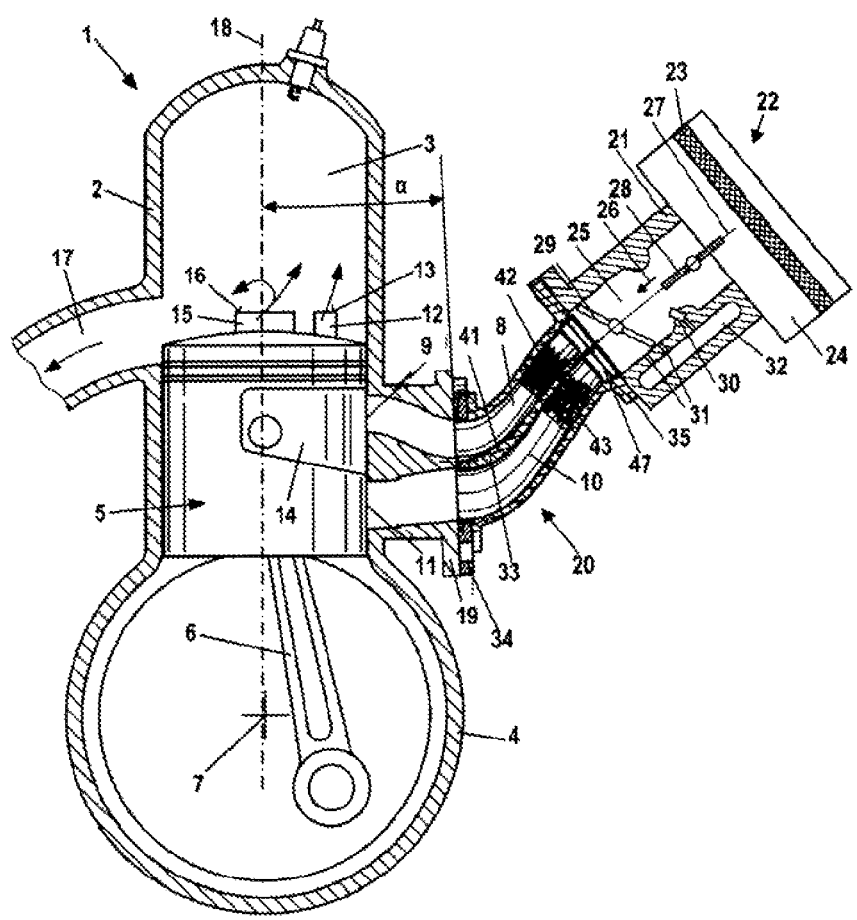

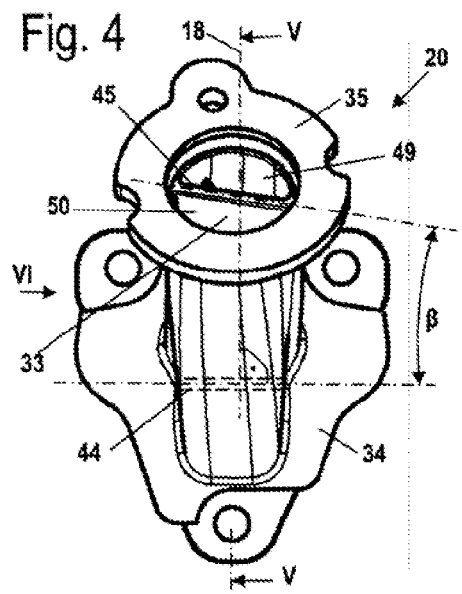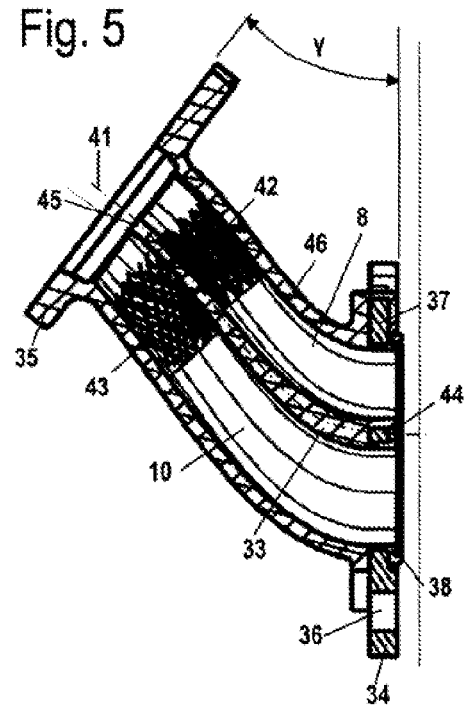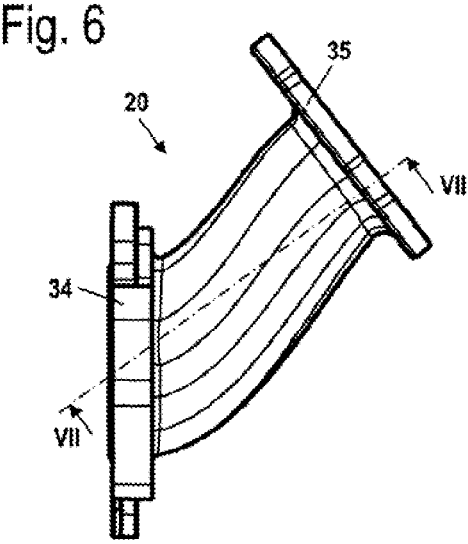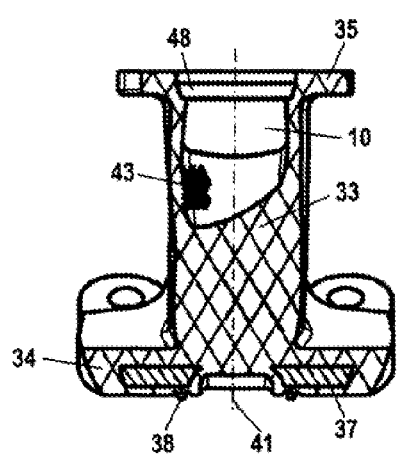

US 8,215,278 B2

INTERNAL COMBUSTION ENGINE HAVING AN ELASTIC CONNECTOR AND METHOD OF PRODUCING SAME

The instant application should be granted the priority date of Jan. 30, 2008, the filing date of the corresponding German patent application 10 2008 006 681.8

BACKGROUND OF THE INVENTION

The present invention relates to an internal combustion engine having an elastic connector, and also relates to a method of producing an elastic connector for an internal combustion engine.

US 2005/0045138 A1 discloses an internal combustion engine having an elastic connecting duct. The elastic connecting duct has two conduits, and in particular a conduit for fuel/air mixture and a second conduit for largely fuel-free air. The connecting duct is made of an elastic material; an adequate elasticity of the connecting duct is achieved by the fact that the two conduits are embodied separately from one another, so that relative movements that occur between the mixture supply mechanism and the internal combustion engine during operation can be compensated for.

EP 1 221 545 A2 discloses an internal combustion engine where downstream of a carburetor, the inlet duct is divided into two passages by a partition wall. One of the passages conveys fuel/air mixture and the other passage conveys combustion air, which depending upon the operating state can contain different quantities of fuel.

It is an object of the present invention to provide an internal combustion engine having an elastic connector, according to which the elastic connector has an adequately great elasticity and at the same time has a high stability. A further object of the invention is to provide a method of producing an elastic connector.

BRIEF DESCRIPTION OF THE DRAWINGS

These and other objects and advantages of the present invention will be described in detail subsequently in conjunction with the accompanying schematic drawings, in which:

FIG. 1 shows a longitudinal cross-sectional view through an internal combustion engine, FIG. 2 is a perspective illustration of the connector of the internal combustion engine of FIG. 1, FIGS. 3 and 4 are end views of the connector of FIG. 2, FIG. 5 is a cross-sectional view taken along the line V-V in FIG. 4, FIG. 6 is a side view taken in the direction of the arrow VI in FIG. 4, FIG. 7 is a cross-sectional view taken along the line VII-VII in FIG. 6, FIGS. 8 and 9 are perspective illustrations of an embodiment of a connector.

SUMMARY OF THE INVENTION

Figure 8:
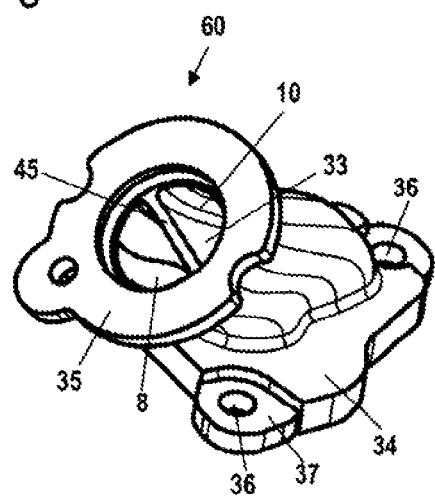
Figure 9:
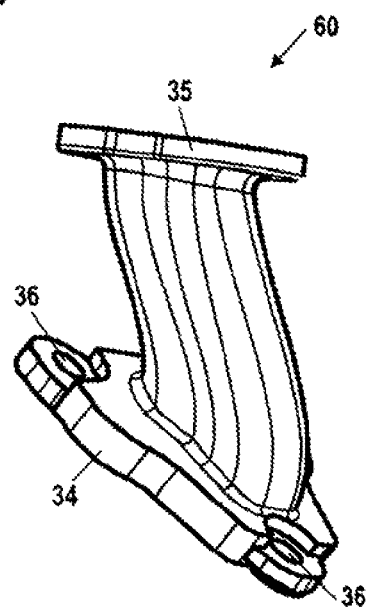

The object of the present application is realized by an internal combustion engine having an elastic connector that connects a fuel supply mechanism with a cylinder of the engine, wherein the elastic connector has a first mixture channel for fuel/air mixture and a second supply channel for combustion air, further wherein the elastic connector has a first connection end and a second connection end, and wherein the first and second channels open out at the first and second connection ends; and having a partition that is disposed in the elastic connector and separates the mixture channel and the supply channel from one another, wherein the partition extends in the longitudinal direction of the channels, and wherein the partition is twisted about its longitudinal central axis between the first connection end and the second connection end.

The object of the present application is also realized by a method of producing an elastic connector for an internal combustion engine, wherein the elastic connector is provided with two channels that are separated from one another by a partition that extends in the longitudinal direction of the channels, and wherein the method includes the steps of using a respective core for each of the channels, and moving the cores relative to one another to enable removal of the elastic connector from a mold.

To achieve a straightforward construction of the internal combustion engine, a first channel for fuel/air mixture and a second channel for combustion air are formed in the elastic connector. The two channels are separated from one another by a partition. The partition, which extends in the longitudinal direction of the connector, increases the stability of the connector in the longitudinal direction, thus making the connector less elastic. However, this greater rigidity cannot arbitrarily be compensated for by a different material or thinner wall thicknesses, since thinner wall thicknesses or the selection of a softer material for the elastic connector could, under certain operating conditions, promote collapse of the channel walls of the connector. In such a case, the connector bends, so that the channels can temporarily be at least partially closed off. This can lead to disruptions in running conditions and even stalling of the internal combustion engine. In order to nonetheless achieve an adequately high elasticity of the connector, the partition is twisted about its longitudinal central axis between the first and the second connection ends. The twisting of the partition about its longitudinal central axis reduces the rigidity of the connector in its longitudinal direction. In this way, an adequate thickness and rigidity of the partition can be ensured, thus ensuring the function of the connector.

The end edge of the partition at the first connection end advantageously forms an angle of approximately 10° to approximately 180° with the end edge of the partition at the second connection end as viewed perpendicular to the plane of the first connection end. The angle is advantageously from approximately 25° to approximately 60°, in particular to approximately 45°. The partition is thus twisted about its longitudinal central axis between the first and the second connection ends by about 10° to about 180°. Consequently, it is possible to achieve an adequately high elasticity of the connector. At the same time, it is still possible to remove the connector from a mold when being manufactured in an injection molding process, or when manufacturing by vulcanization. It has furthermore been shown that due to the twisting of the partition, favorable installation conditions result since also the fuel supply mechanism can be installed twisted about an appropriate angle. As a result, the installation space that is available can be better utilized.

The longitudinal central axis of the partition at the first connection end advantageously has a spacing relative to the longitudinal central axis of the partition at the second connection end that is measured perpendicular to the longitudinal central axis in the first connection end and perpendicular to the longitudinal axis of the cylinder of the internal combustion engine. The second connection end is thus laterally offset relative to the first connection end and relative to the longitudinal cylinder axis. Due to the lateral offset of the two connection ends relative to one another, a further increase of the elasticity is achieved without noticeably adversely affecting the stability of the connector. The lateral offset also enables a better utilization of the installation space that is available, so that on the whole the internal combustion engine requires a smaller installation space. The spacing is advantageously approximately 2 mm to approximately 15 mm, in particular approximately 4 mm to approximately 10 mm. This offset is sufficient to achieve a greater elasticity of the connector. Since the spacing is relatively small, a removal of the connector from a mold is still possible, even if the connector is produced in a vulcanization process or in an injection molding process with only two cores.

The first connection end is advantageously inclined relative to the second connection end. This inclination of the two connection ends relative to one another leads to different lengths of the two channels. By means of the inclination, the desired ratio of the channel lengths relative to one another can be established. At the same time, the inclination of the connection ends relative to one another can also lead to a better utilization of the installation space that is available. The mounting flange at the cylinder can be shorter, and the connector can in contrast be longer. Due to the fact that a greater channel length is formed in the connector, which is made of polymeric material, in particular rubber, and a shorter channel portion is formed in the metallic cylinder flange, the overall weight of the internal combustion engine is reduced. The angle between the first and second connection ends is advantageously approximately 15° to approximately 60°, in particular approximately 25° to approximately 45°. The angle between the two connection ends advantageously opens toward that side of the connector that faces the mixture channel. This results in a greater length of the mixture channel and a shorter length for the air channel. This leads to an improved running condition of the internal combustion engine.

The first connection end advantageously faces the cylinder, while the second connection end faces the mixture supply mechanism. The end edge of the partition at the first connection end is advantageously disposed in a plane that is disposed perpendicular to the cylinder axis. As a result, the mixture channel and the air channel open out one above the other at the cylinder flange. As a result, a symmetrical supply of scavenging air to both sides of the cylinder is made possible. The first connection end is advantageously inclined relative to the longitudinal axis of the cylinder by an angle of approximately 3° to approximately 30°. The inclination of the cylinder flange provides adequate installation space for the mounting of the connector. At the same time, the cylinder flange can be made relatively short. The angle between the first connection end and the longitudinal axis of the cylinder advantageously opens toward that side that faces the mixture channel. The angle between the first connection end and the longitudinal cylinder axis advantageously opens toward that side that faces the crankcase.

With channels that supply fuel/air mixture to the internal combustion engine, fuel can deposit on the walls of the channel and, upon pivoting of the internal combustion engine, can pass in a surging manner to the internal combustion engine and can adversely affect the running condition of the engine. To avoid this, at least one channel that is formed in the connector can be provided with a structured inner surface. The inner surface is advantageously provided with a plurality of raised portions having the shape of pyramids. The fuel can accumulate between the raised portions. Thus, the formation of drops or pools of fuel in the channel can be prevented. The raised portions advantageously have side surfaces that are oriented in the longitudinal direction of the channel. Since in some operating states fuel/air mixture is supplied not only via the air channel but also via the mixture channel, both of the channels can be provided with a structured inner surface. Due to the orientation of the raised portions in the longitudinal direction of the channel, it is possible despite the raised portions on both sides of the partition to remove the connector from a mold during production in an injection molding process.

The first connection end is advantageously formed on a first mounting flange and the second connection end is advantageously formed on a second connection flange. As a result, the connector can be easily secured to adjoining components. However, it would also be possible to secure one or both of the connection ends to a separate mounting flange.

As indicated previously, for a method for producing an elastic connector for an internal combustion engine, whereby the connector has two channels that are separated from one another by a partition that extends in the longitudinal direction of the channels, for each channel a core is used, and the two cores are moved relative to one another to enable removal of the connector from a mold.

During the removal of an elastic connector from a mold, the channels must be expanded or spread apart, so that the connector can be withdrawn from the cores. However, the partition cannot shift since a core is disposed on both sides of the partition. Due to the fact that the two cores are moved relative to one another for the removal from a mold, the spacing of the core in the region of the partition can be increased, thus making removal of the connector from a mold very possible. The connector is advantageously made of a polymeric material, including rubber, and is produced in an injection molding process or, when produced from rubber, in a vulcanization process.

For the removal from a mold, the cores are advantageously moved relative to one another in a direction of pulling that is inclined relative to the longitudinal central axis of the partition of the connector. Due to the fact that the direction of pulling is inclined relative to the partition of the connector, an excessive stretching of the connector toward the outside is avoided. Due to the movement transverse to the partition of the connector, the spacing of the cores in the region of the partition can be easily increased.

At least one of the channels is provided with a structured inner surface, which includes pyramid-shaped raised portions. To ensure that the pyramid-shaped raised portions can be removed from a mold, the raised portions, especially the side surfaces of the raised portions that are disposed in the longitudinal direction of the channel, are oriented approximately parallel to the direction of pulling. As a result, a tearing-off of the raised portions during the movement of the cores relative to one another is avoided. The surfaces of the pyramid-shaped raised portions that are oriented parallel to the direction of pulling can furthermore be readily removed from the mold in the pulling direction. For the removal from a mold, the two cores can be moved relative to one another by a displacement amount that corresponds at least to the height of the raised portions as measured in the pulling direction. In this connection, advantageously only one of the cores is moved, while the other core can be stationary.

Further specific features of the present application will be described in detail subsequently.

DESCRIPTION OF SPECIFIC EMBODIMENTS

Referring now to the drawings in detail, the internal combustion engine 1 shown in FIG. 1 is a single-cylinder engine, and in particular a two-cycle engine that operates with scavenging. The internal combustion engine 1 can serve, for example, for driving the tool of a manually-guided implement such as a power saw, a cut-off machine or the like. The internal combustion engine 1 has a cylinder 2 in which is formed a combustion chamber 3. The combustion chamber 3 is delimited by a piston 5 that is reciprocably mounted in the cylinder 2 and that, via a connecting rod 6, rotatingly drives a crankshaft 7 that is rotatably mounted in a crankcase 4. A supply channel 8 for air, and a mixture channel 10, open out at the cylinder 2. The supply channel 8 opens out at the cylinder 2 via an air inlet 9. Two air inlet openings are advantageously provided on either side of the section plane shown in FIG. 1. The mixture channel 10 opens out at the cylinder 2 via a mixture inlet 11 that is port-controlled by the piston 5.

The internal combustion engine 1 has total of four transfer channels 12, 15, which are disposed symmetrically relative to the section plane shown in FIG. 1. The transfer channels 12 that are close to the inlet open into the combustion chamber 3 via transfer windows 13, and the transfer channels 15 that are disposed remote from the mixture inlet 10 open into the combustion chamber 3 via transfer windows 16. An outlet 17 leads out of the combustion chamber 3. The piston has at least one piston pocket 14. Two piston pockets 14 are advantageously disposed on either side of the plane of symmetry shown in FIG. 1 as the section plane. In the region of the upper dead center position of the piston 5, the air inlet 9 is connected via the piston pocket 14 with the transfer windows 13 and 16 of the transfer channels 12 and 15, so that by means of the piston pocket 14 scavenging air can be temporarily stored in the transfer channels 12 and 15.

The cylinder 2 has a cylinder flange 19, to which is secured a connector 20. The connector 20 is essentially comprised of an elastic material, advantageously of a polymeric material, in particular of a rubber or an elastomer. In the elastic connector 20, the air or supply channel 8 and the mixture channel 10 are guided as channels that are completely separated from one another. The connector 20 has a first mounting flange 34, which is fixed to the cylinder flange 19. At the opposite end, the connector 20 has a second mounting flange 35, which is secured to a carburetor 21, which in turn is connected to an air filter 22. The air filter 22 has filter material 23 that separates a clean chamber 24 from the atmosphere. An intake channel 25, which is guided in the carburetor 21, opens into the clean chamber 24. Pivotably mounted in the carburetor 21 are a choke valve 28, and downstream thereof a throttle valve 29. The butterfly valve 29 is disposed downstream of the choke valve 28 relative to a direction of flow 26 from the air filter 22 to the cylinder 2. In the completely opened position shown in FIG. 1, the choke valve 28 is oriented in the direction of the longitudinal axis 27 of the intake channel 25. The butterfly valve 29 is shown in a largely closed position. In the completely opened position, the butterfly valve 29 is also oriented in the direction of the longitudinal intake channel axis 27. Thus, the butterfly valve 29 and the choke valve 28 are disposed in a plane, so that when the valves 28, 29 are both completely opened, the intake channel 25 is largely divided by them into two channel portions.

A main fuel opening 30 as well a number of secondary fuel openings 31 open out into the intake channel 25. In this connection, the fuel openings 30 and 31 open out into the intake channel 25 on that side of the choke valve 28 and the butterfly valve 29 that is disposed upstream of the mixture channel 10. The opposite side of the intake channel 25 is disposed upstream of the supply channel 8 for air. The fuel openings 30 and 31 are supplied from a fuel chamber 32, which is advantageously the regulation chamber of the carburetor 21, which is embodied as a diaphragm carburetor.

The connector 20 has a partition 33 against which the butterfly valve 29, in the completely open position, can partially rest. In the region of the mounting flange 35, there is provided on the connector 20 an intermediate ring 47, which can, for example, be comprised of an inherently stable polymeric material or of metal, and against which the butterfly valve 29 can also rest. The intermediate ring 47 can have a partitioned portion that supports the partition 33 of the connector 20.

As schematically indicated in FIG. 1, the inner upper surfaces of the supply channel 8 and of the mixture channel 10 have a structured configuration. The supply channel 8 has a knurling 42, and the mixture channel 10 has a knurling 43. In each case, the knurling is shown only schematically, and can respectively extend over a portion of the length of the channels 8, 10 or can extend over their entire lengths. Furthermore, a structuring or texturing, in particular a knurling 42, 43, can also be provided only in the supply channel 8 or advantageously only in the mixture channel 10.

As shown in FIG. 1, the cylinder flange 19 is inclined relative to the longitudinal axis 18 of the cylinder 1 by an angle $\alpha$ that can advantageously be approximately 1° to approximately 15°. The angle $\alpha$ opens out in the direction toward the crankcase 4 and toward the mixture channel 10.

When the internal combustion engine 1 is in operation, during an upward stroke of the piston 5 fuel/air mixture is drawn into the crankcase 4 through the mixture channel 10. By means of the piston pocket 14, combustion air from the supply channel 8 is temporarily stored in the transfer channels 12, 15. During partial throttle or during idling, the combustion air, which is supplied by the supply channel 8, can contain fuel. During full throttle operation, when the butterfly valve 29 is oriented parallel to the longitudinal axis 27 of the intake channel 25, the combustion air supplied by the supply channel 8 is advantageously largely free of fuel.

During the downward stroke of the piston 5, the fuel/air mixture in the crankcase 4 is compressed. As soon as the transfer windows 13 and 16 are opened by the downward traveling piston 5, first the temporarily stored scavenging air flows into the combustion chamber 3. Subsequently, fuel/air mixture flows in from the crankcase 4. During the upward stroke of the piston 5, the mixture is compressed in the combustion chamber 3 and is ignited in the region of the upper dead center position of the piston 5. In this connection, the piston 5 moves in the direction of the longitudinal axis 18 of the cylinder 2. During the downward stroke of the piston 5, first the outlet 17 is opened, so that exhaust gases can escape from the combustion chamber 3. The transfer windows 13 and 16 are subsequently opened. The scavenging air that flows into the combustion chamber 3 through the transfer windows 13 and 16 displaces or expels the remaining exhaust gases from the combustion chamber 3 and scavenges them through the outlet 17. This achieves a good separation of the exhaust gases from the fresh mixture that subsequently flows in from the crankcase 4.

When the internal combustion engine 1 is installed in a manually-guided implement such as a power saw, a cut-off machine, a brush cutter, a trimmer or the like, the internal combustion engine 1 is mounted so as to be vibration-isolated from the handles or grips of the implement in order to keep the strain on the operator low. Advantageously, the carburetor 21 is also vibration-isolated from the internal combustion engine 1, so that also at the carburetor 21 only slight vibration stresses occur. The connector 20 must bridge the relative movements that during operation occur between the carburetor 21 and the cylinder 2 of the internal combustion engine 1. For this purpose, the connector 20 must have an adequate elasticity. At the same time, the connector 20 must also have an adequate stability.

FIGS. 2 to 7 show the configuration of the connector 20 in detail. As FIGS. 2 and 3 show, the first mounting flange 34 has three mounting openings 36 for the fixation of the connector 20 to the cylinder 2. The mounting openings 36 are formed in a core 37, which is also shown in the cross-sectional view of FIG. 5. The core 37 is comprised of an inherently stable material, advantageously of a light metal such as aluminum or the like. The core 37 itself can be comprised of a plurality of components, for example a harder and a softer component, in order to achieve good strength characteristics, a good bonding to the elastic material 46 of the connector, and a long service life during operation. The elastic material 46 of the connector 20 is sprayed about the cores 37. In the region of the mounting openings 36, the elastic material 46 is recessed, thus enabling a good fixation of the connector 20 to the cylinder flange 19. High contact pressures can be achieved, so that an adequate sealing is obtained.

As shown in FIG. 2, at the second mounting flange 35 the partition 33 has an end edge 45, which in the illustrated embodiment extends approximately perpendicular to the longitudinal central axis 41 (FIG. 5) of the partition 33. The end edge 45 need not have a linear configuration, but rather can also be provided with a circular recess, for example for the butterfly valve 29. The second mounting flange 35 of the connector 20 has a receiving means 48 for the intermediate ring 47.

The first mounting flange 34 is shown in FIG. 3. The supply channel 8 opens out at the first mounting flange 34 via an outlet opening 39, and the mixture channel 10 opens out via an outlet opening 40. As shown in FIG. 3, a sealing means 38, which is comprised of the elastic material 46 of the elastic connector 20, is sprayed or extruded onto the first mounting flange 34. The sealing means or seal 38 surrounds both of the outlet openings 39 and 40. At the first mounting flange 34, the partition 33 has an end edge 44, on which also the sealing means 38 is sprayed or extruded, so that the two channels 8, 10 are entirely separated from one another at the first mounting flange 34 by the sealing means 38. In FIG. 3, in the direction of viewing, also the position of the longitudinal axis 18 of the cylinder 2 is schematically shown perpendicular to the first mounting flange 34. As shown in FIG. 3, the end edge 44 of the partition 33 is perpendicular to the longitudinal cylinder axis 18.

As shown in FIG. 4, the supply channel 8 opens out at the second mounting flange 35 via an outlet opening 49, and the mixture channel 10 opens out via an outlet opening 50. The two outlet openings 49 and 50 are separated from one another by the planar, relatively thin partition 33. In a projection into the plane of the first mounting flange 34, the end edge 45 is inclined relative to the end edge 44 by an angle β. The angle β is advantageously approximately 10° to approximately 180°, expediently approximately 10° to approximately 60°, and in particular approximately 25° to approximately 45°. Particularly advantageous is an angle β of approximately 30°. Due to the inclination of the two end edges 44, 45 relative to one another, the partition 33 is twisted about its longitudinal central axis 41 over its entire length (see also FIG. 5). This reduces the rigidity of the connector 20 in the longitudinal direction. If the end edges 44 or 45 are not linear, but rather, for example, have a curved or similar configuration, the specifications for the angle β relate to the extension of the partition 33 into the planes of the mounting flanges 34 and 35.

Due to the twisting of the partition 33, there results in the cross-sectional illustration of FIG. 7 a section edge that is inclined relative to the longitudinal central axis 41 of the partition 33. The sprayed or injected-in core 37 and sealing means 38 are also very visible in FIG. 7. The knurling 43 is only indicated in FIG. 7.

As shown in FIG. 5, the first mounting flange 34 is inclined relative to the second mounting flange 35 by an angle γ that is approximately 15° to approximately 60°, in particular approximately 25° to approximately 45°. An angle γ of approximately 35° to approximately 40° is advantageous. The angle γ opens toward the mixture channel 10. The angle γ is measured in a plane that is disposed transverse to the partition 33, advantageously perpendicular to the end edge 44 of the partition 33. Due to the angle γ, the mixture channel 10 in the connector 20 is longer than the supply channel 8. Due to the inclination of the mounting flanges 34 and 35 relative to one another, a suitable channel length ratio of supply channel 8 and mixture channel 10 can be established.

FIGS. 8 to 14 show a further embodiment of a connector 60. The same reference numerals designate the same elements as in the embodiment of FIGS. 1 to 7. A supply channel 8 and a mixture channel are also formed in the connector 60, and are separated from one another by a partition 33. The connector 60 has a first mounting flange 34 with mounting openings 36 and core 37, as well as a second mounting flange 35.

Figure 10:
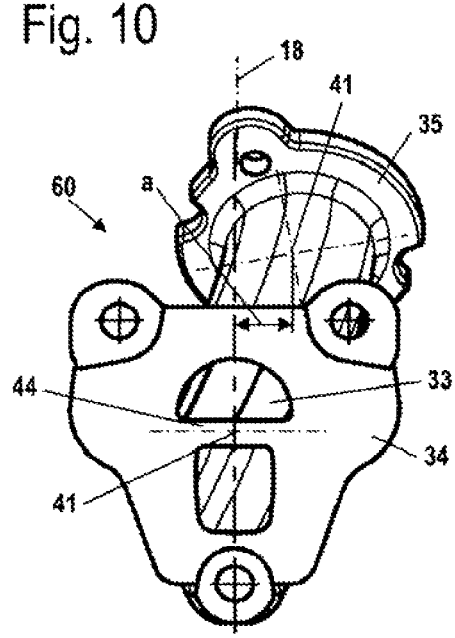
FIGS. 10 and 11 are end views of the connector of FIGS. 8 and 9.
Figure 11:
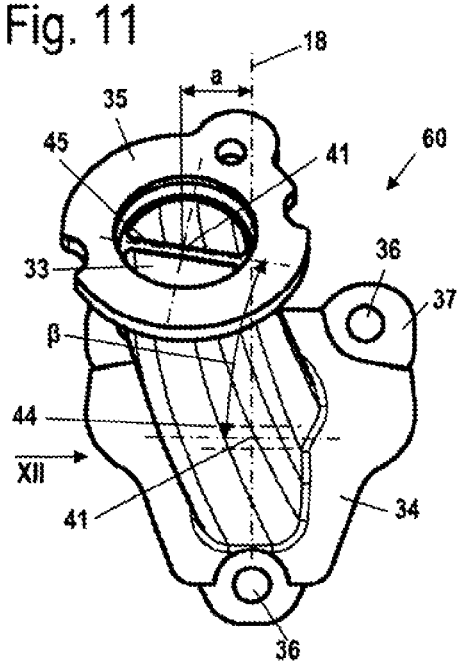

As shown in FIGS. 10 and 11, the end edge 44 of the partition 33 at the first mounting flange 34 extends perpendicular to the longitudinal axis 18 of the cylinder 2. As furthermore shown in FIGS. 10 and 11, the longitudinal central axis 41 of the partition 33 at the first mounting flange 34 has a lateral offset a relative to the longitudinal central axis 41 at the second mounting flange 35. The offset a is measured from a projection of the longitudinal central axis 41 into the plane of the first mounting flange 34 and perpendicular to the longitudinal cylinder axis 18. The offset a exists relative to a plane that is defined by the longitudinal central axis 41 at the first mounting flange 34 and the longitudinal cylinder axis 18. This plane extends perpendicular to the plane of the drawing sheet in FIGS. 10 and 11. The distance or spacing a is advantageously approximately 2 mm to approximately 15 mm, in particular approximately 4 mm to approximately 10 mm.

As shown in FIG. 11, the end edge 45 of the partition 33 at the second mounting flange 35 is inclined relative to the end edge 44 at the first mounting flange 34 by an angle β. The angle β is advantageously approximately 10° to approximately 180°, in particular approximately 25° to approximately 45°.

Figure 12:
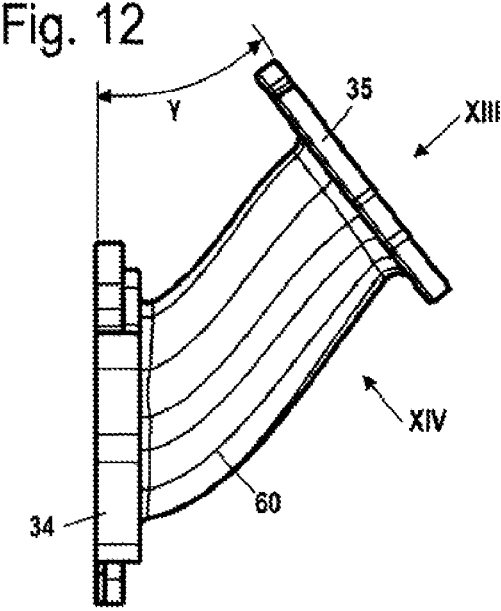
FIG. 12 is a side view taken in the direction of the arrow XII in FIG. 11.
Figure 13:
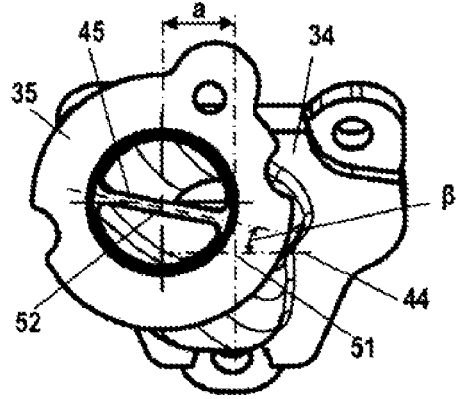
FIG. 13 is an end view taken in the direction of the arrow XIII in FIG. 12.
Figure 14:
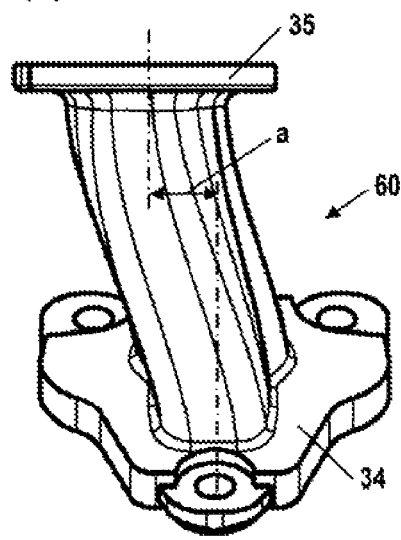
FIG. 14 is a side view taken in the direction of the arrow XIV in FIG. 12.

As shown in FIG. 12, the first mounting flange 34 is inclined relative to the second mounting flange 35 by an angle γ that corresponds to the angle γ of the first connector 20. In FIGS. 13 and 14, the angle β and the distance a are shown in a projection into the second mounting flange 35.

Figure 15:
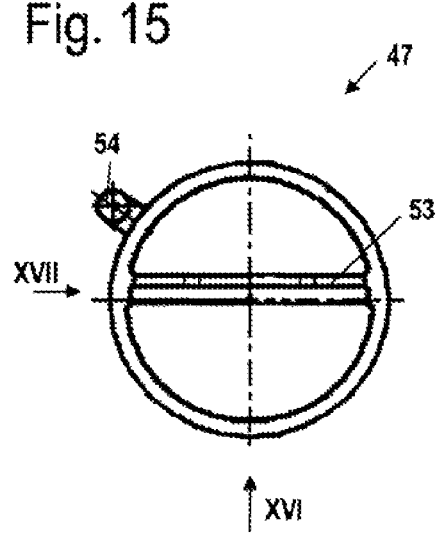
FIG. 15 is an end view of an intermediate ring.
Figure 16:
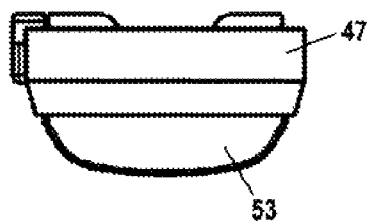
FIG. 16 is a side view taken in the direction of the arrow XVI in FIG. 15.
Figure 17:
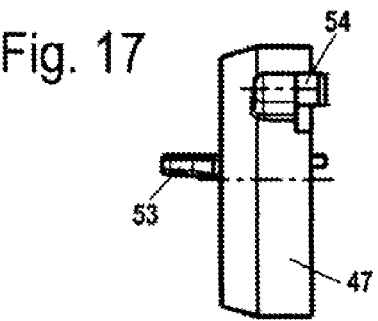
FIG. 17 is a side view taken in the direction of the arrow XVII in FIG. 15.

FIGS. 15 to 17 show the intermediate ring 47. Formed on the intermediate ring 47 is a partition portion 53 that extends on both sides of the intermediate ring 47. Also disposed on the intermediate ring 47 is a pin 54 that projects toward the carburetor 21 and can serve for position securement.

Figure 18:
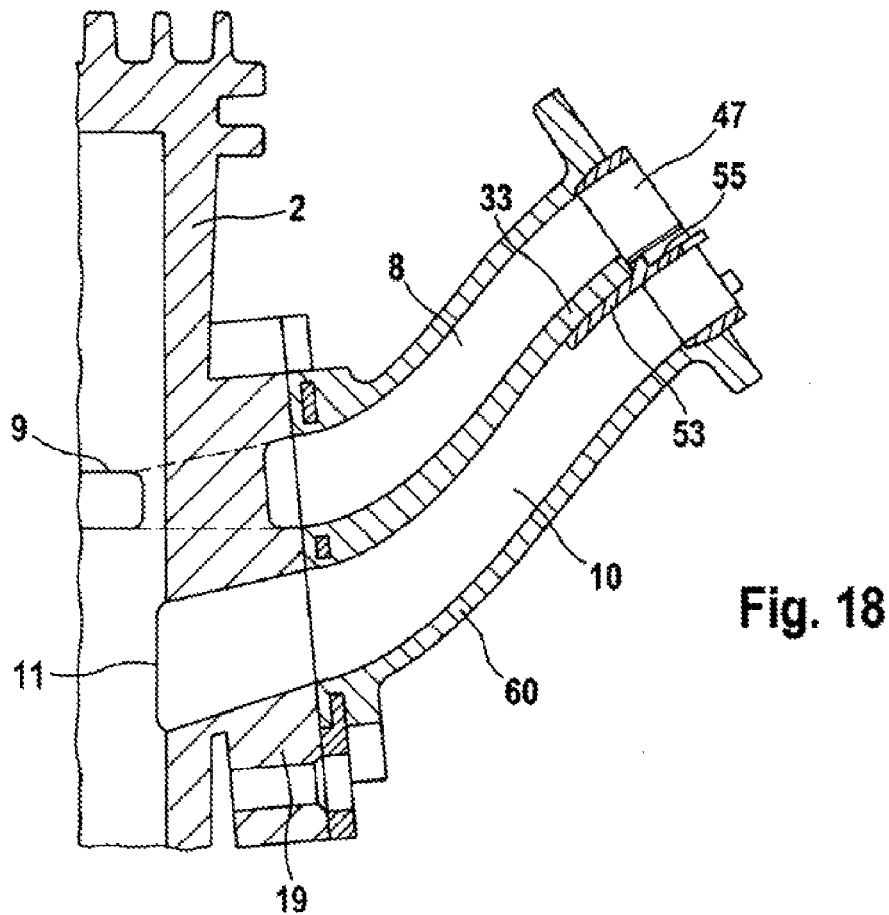
FIG. 18 is a schematic cross-sectional illustration of the connector of FIGS. 8 to 14 on a cylinder.

FIG. 18 shows the intermediate ring 47 on the connector 60. As shown in FIG. 18, a partition portion 53 rests against that side of the partition 33 that faces the mixture channel 10. The partition 33 is supported by the partition portion 53. The partition portion 53 can also be disposed on that side of the partition 33 that faces the supply channel 8, or can extend around the partition 33. On that side that faces the carburetor 21, the partition portion 53 has an abutment surface 55 for the butterfly valve 29 against which the butterfly valve rests in the completely opened position.

On the elastic connector 60 no seal 38 is shown at the first mounting flange 34; advantageously, however, here also a seal 38 is provided. Also the connector 60 advantageously has knurlings 42 and 43 in both of the channels 8, 10.

Figure 19:
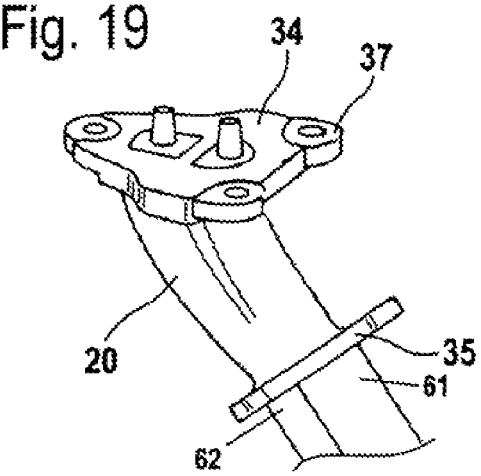
FIG. 19 is a perspective illustration of cores for the production of a connector and having a connector disposed thereon.

The connectors 20, 60 can be produced by vulcanization out of rubber, or in an injection molding process from other polymeric materials such as elastomers or thermoplastic elastomers. During the manufacture, at the same time also the core 37 is encased with elastic material. In order to form the two channels 8 and 10, the cores 61 and 62 shown in FIG. 19 are provided. Each core 61, 62 forms the inner wall of a channel 8, 10. In this connection, the first core 61 projects into the supply channel 8, and the second core 62 projects into the mixture channel 10. In particular if the connectors 20, 60 are provided with knurlings 42 and 43 in the channels 8 and 10, a removal of the connector 20, 60 from a mold is very difficult, since there is the danger that the knurlings 42, 43 will be torn off in the region of the partition 33 during the removal from the mold.

Figure 20:
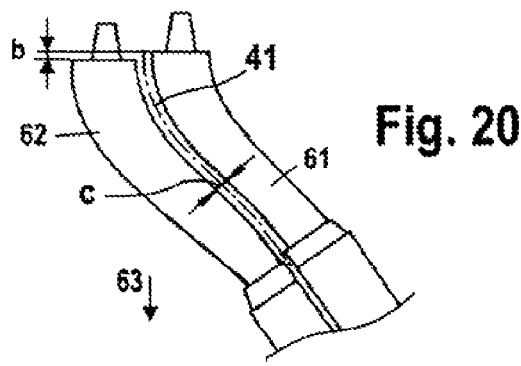
FIG. 20 is a side view of the cores of FIG. 19.

However, in order to permit the manufacture of the connector 20, 60 in a vulcanization or injection molding process, the two cores 61 and 62 are movable relative to one another. Advantageously, the first core 61 is stationary and the second core 62 can, in the direction of pulling 63 shown in FIG. 20, be moved downwardly by a displacement amount b, in other words, can be moved out of the connector 20, 60. The direction of pulling 63 is oriented perpendicular to the first mounting flange 34. Thus, the direction of pulling 63 is inclined relative to the longitudinal central axis 41 of the partition 33 by an angle of between 0° and 90°, advantageously between 20° and 70°. Due to the inclination of the direction of pulling 63 relative to the longitudinal central axis 41, the spacing c between the two cores 61 and 62 is increased during the movement of the core 62 in the direction of pulling 63. Thus, the partition 33, with knurlings 42 and 43 disposed on both sides of the partition 33, can be removed from a mold. A corresponding movement of the core 62 is also advantageous if only one of the channels 8, 10 is provided with a knurling.

Figure 21:
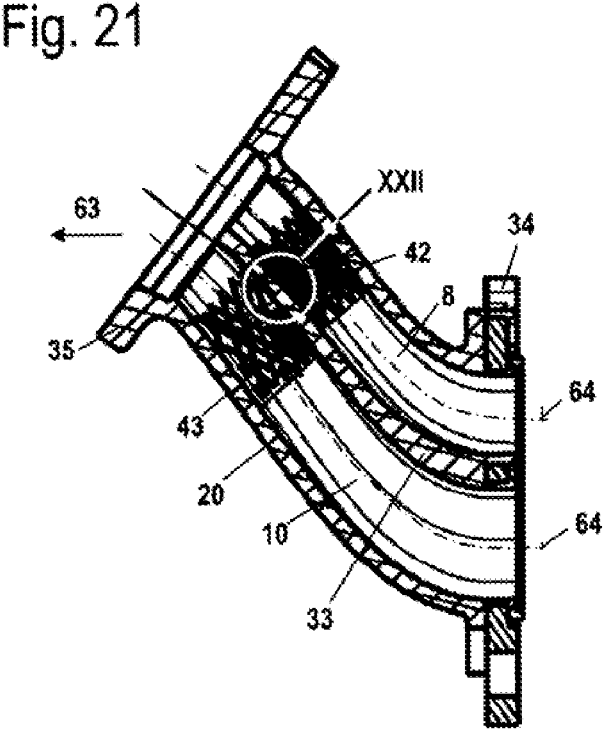
FIG. 21 is a cross-sectional view through a connector.
Figure 22:
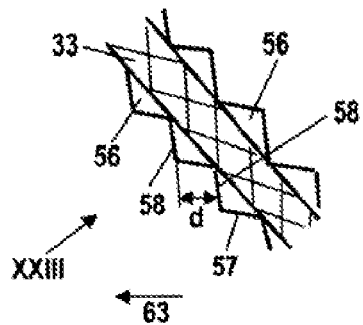
FIG. 22 is an enlarged illustration of the detail XXII in FIG. 21.
Figure 23:
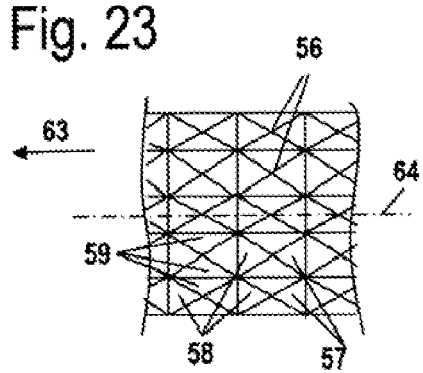
FIG. 23 is a plan view onto an inner surface of the connector taken in the direction of the arrow 23 in FIG. 22.

FIGS. 21 to 23 show the configuration of the knurlings 42 and 43 in order to enable an easy removal of the connector 20 from a mold. The knurlings 42, 53 on the connector 60 are correspondingly designed. In each case, the knurlings 42 and 43 are comprised of a plurality of elevations or raised portions 56, each of which has the shape of a pyramid. Each raised portion 56 has a first surface 57, which is disposed in the direction of pulling 63, in particular approximately parallel to the direction of puling 63, as well as a second surface 58 that is disposed transverse, and in particular approximately perpendicular, to the direction of pulling 63. Each raised portion 56 has a height d that at the most corresponds to the displacement b. In this connection, the height d is not measured perpendicular to the partition 33, but rather is measured in the direction of pulling 63 and corresponds to the spacing between two surfaces 58 of the raised portions 56 that are disposed adjacent to one another in the longitudinal direction.

As shown in FIG. 23, the raised portions 56 are disposed one after the other in the longitudinal channel direction 64. Thus, the raised portion 56 are oriented parallel to the longitudinal channel direction 64 and in the direction of pulling 63. The side surfaces 59 of the raised portions 56 are disposed parallel to the longitudinal channel direction 64 and thereby in the direction of pulling 63 form no undercuts, so that they can be removed from a mold without any problems. The side surfaces 57 can be inclined slightly relative to the direction of pulling 63 in order to realize a mold removal angle. The direction of the inclination of the surfaces 57 is to be selected such that no undercut results. The second surfaces 58 can be provided with a different orientation since they are disposed transverse to the direction of pulling 63 and can thus be removed from a mold without any problems. As shown in FIG. 23, the raised portions 56 are aligned relative to the direction of pulling 63 and parallel to the longitudinal channel direction 64.

Figure 24:
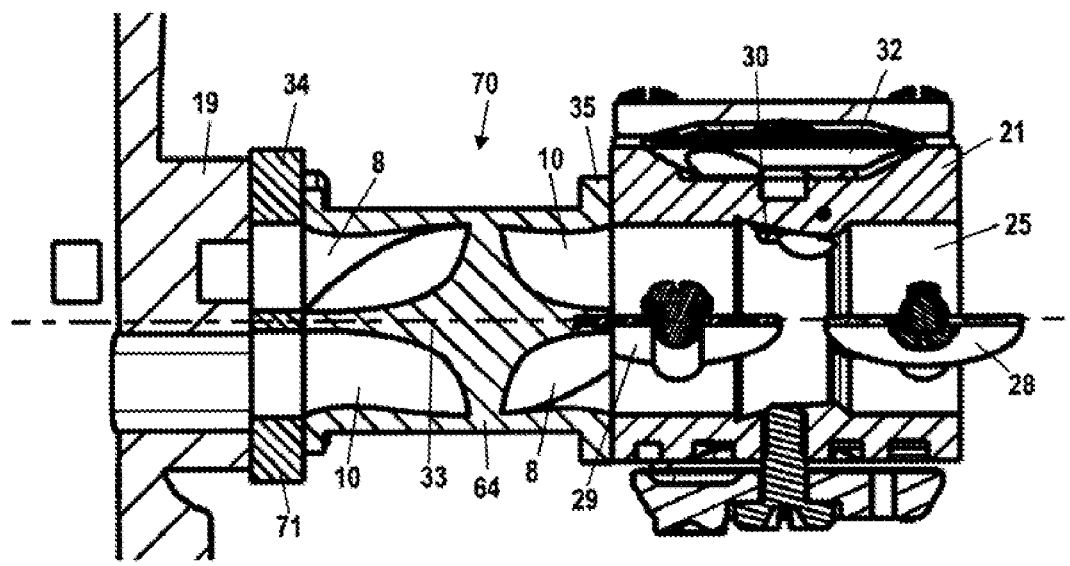
FIG. 24 is a cross-sectional illustration of an embodiment of a connector disposed between a carburetor and a cylinder.
Figure 25:
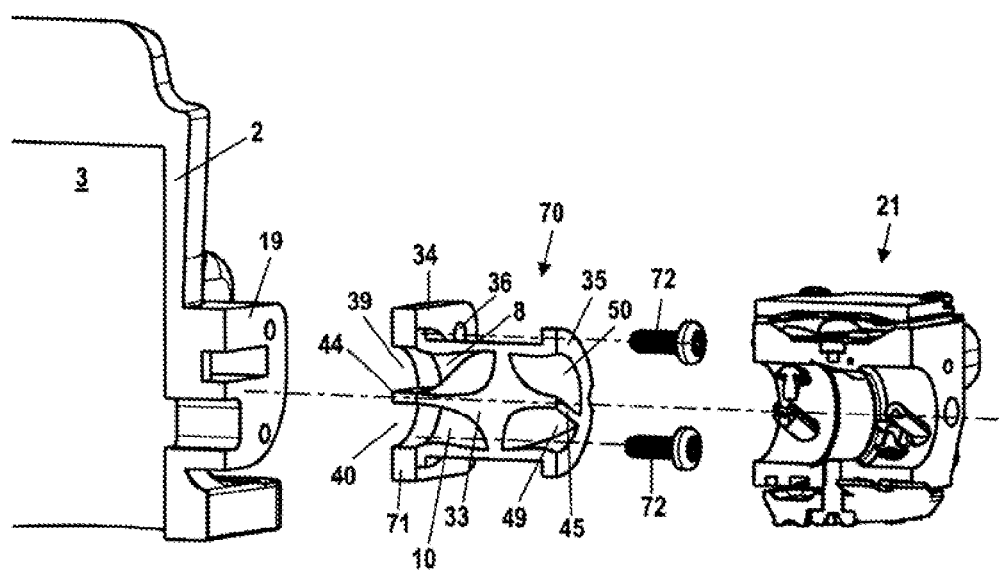
FIG. 25 is an exploded view of the arrangement of FIG. 24.
Figure 26:
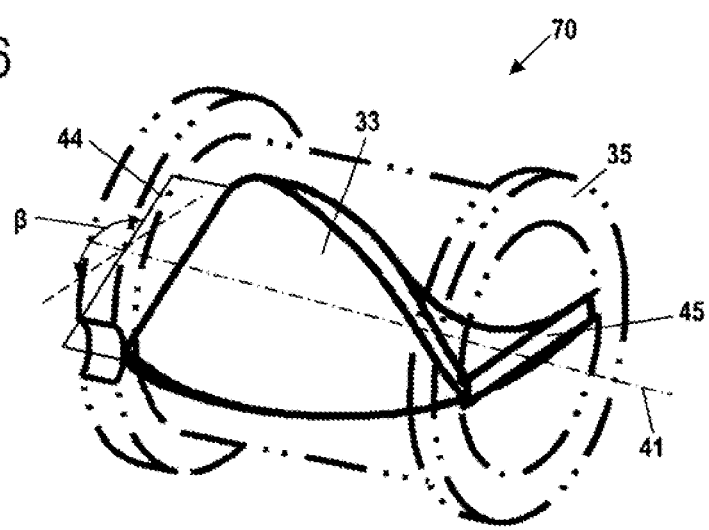
FIG. 26 is a perspective illustration of the connector of FIGS. 24 and 25.

FIGS. 24 to 26 show an embodiment of a connector 70. Here again elements that correspond to one another have the same reference numerals as in the previous embodiments. The connector 70 is disposed between a carburetor 21 and a cylinder flange 19. A mixture channel 10 and a supply channel 8 for combustion air are guided in the connector 70. The two channels 8, 10 are separated from one another by a partition 33. The connector 70 is secured to the cylinder flange 19 via a mounting flange 34, and is secured to the carburetor 21 via a mounting flange 35. The mounting flange 34 includes a flange plate 71, which can be made of an inherently stable material such as an inherently stable polymeric material or of metal. The flange plate 71 does not have the elastic material 46 of the connector 70 sprayed or injected about it, but rather is sprayed or injected onto the material of the connector.

As shown in FIG. 25, the flange plate 71 of the mounting flange 34 is provided with mounting openings 36, by means of which the connector 70 can be secured to the flange 19 via mounting screws 72. As also shown in FIG. 25, the supply channel 8 opens out at the mounting flange 34 via an outlet opening 39, and at the mounting flange 35 via an outlet opening 49. The mixture channel 10 opens out at the mounting flange 34 via an outlet opening 40, and at the mounting flange 35 via an outlet opening 50. As shown in FIG. 25, the supply channel 8 at the cylinder 2 is disposed on that side of the mixture channel 10 that faces the combustion chamber 3, and at the carburetor 21 the supply channel 18 is disposed on that side of the mixture channel 10 that faces away from the combustion chamber 3 and faces the crankcase, which is not shown in FIG. 25.

In FIG. 26, the contour of the partition 33 is clearly schematically indicated. The partition 33 is embodied as a thin plate that is twisted about its central longitudinal axis 41. At the mounting flange 35, the partition 33 has an end edge 45 that projects up to the carburetor 21. At the opposite end, the partition 33 has an end edge 44 that is formed on the flange plate 71, which is not shown in FIG. 26. The end edges 44 and 45 are rotated relative to one another about an angle β, which can be up to 180°. In the embodiment illustrated in FIGS. 24 to 26, the angle β is advantageously between approximately 120° and approximately 180°. As a result, the rigidity in the longitudinal direction of the channel can be greatly reduced.

As shown in FIGS. 24 to 26, the surfaces of the mounting flanges 34 and 35 of the connector 70 are disposed parallel to one another and, as viewed in the longitudinal channel direction, are aligned with one another, so that no lateral offset results.

Figure 27:
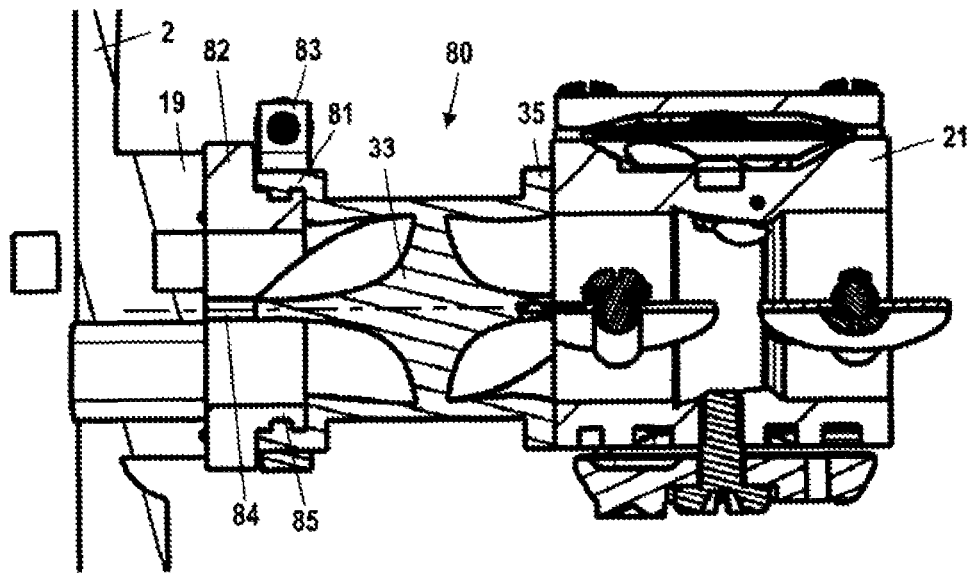
FIG. 27 is a cross-sectional illustration of an embodiment of a connector disposed between a carburetor and an internal combustion engine.
Figure 28:
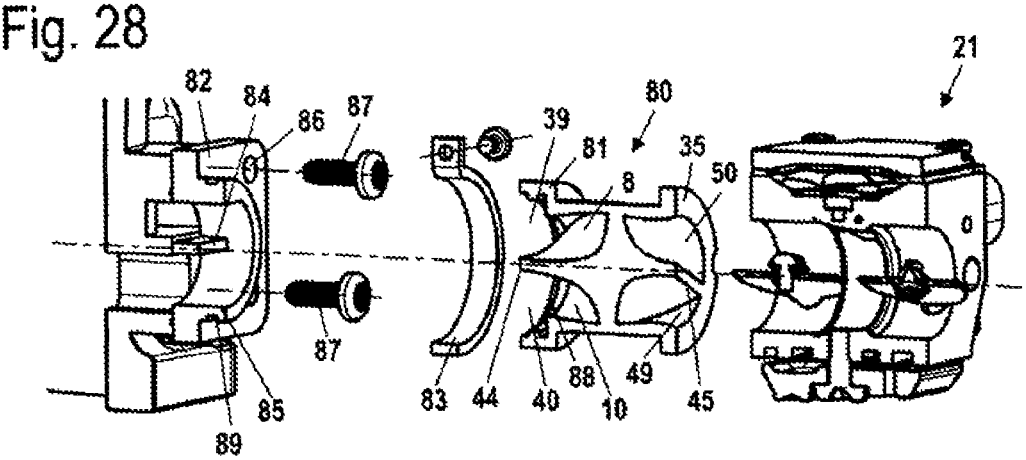
FIG. 28 is an exploded view of the arrangement of FIG. 27.
Figure 29:
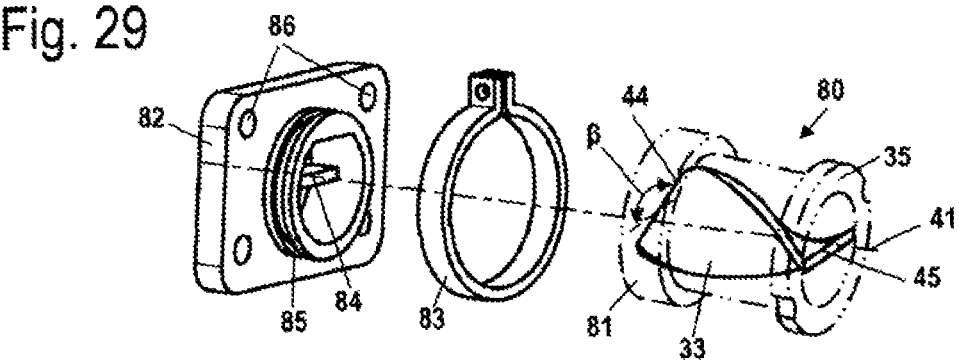
FIG. 29 is a perspective illustration of the connector of FIGS. 27 and 28.

FIGS. 27 to 29 show a further embodiment of a connector 80. The connector 80 essentially corresponds to the connector 70. The same reference numerals here also represent the same elements. The connector 80 has a mounting flange 35 for the connection with the carburetor 21. At its opposite end, the connector 80 has a connection rim 81 that is secured to a separate mounting flange 82. The mounting flange 82 is secured to the cylinder flange 19 via the mounting screws 87, which are shown in FIG. 28. For this purpose, a total of four mounting openings 86 are provided in the mounting-flange 82.

The mounting flange 82 has a securement rim 85, over which extends the connection rim 81 of the connector 80. The connection rim 81 is fixed on the securement rim 85 via a clamp strap 83.

As shown in FIG. 28, the connection rim 81 has a circumferential raised element 88 on an inner surface thereof that projects into a circumferential groove 89 on the securement rim 85, thus enabling a form-fitting fixation of the connector 80 on the mounting flange 82. As also shown in FIG. 28, formed on the mounting flange 82 is a partition portion 84 against which the partition 33 abuts, as shown in FIG. 27.

As shown in FIG. 28, the mixture channel 8 opens out at the connecting rim 81 via an outlet opening 40, and at the mounting flange 35 via an outlet opening 50. The supply channel 8 opens out at the connection rim 81 via an outlet opening 39, and at the mounting flange 35 via an outlet opening 49.

FIG. 29 schematically shows the contour of the partition 33 in the connector 80. The partition 33 has an end edge 45 at the mounting flange 35 as well as an end edge 44 at the connection rim 81. The partition 33 is twisted about its longitudinal central axis 41 and in particular between the mounting-flange 35 and the connection rim 81 by an angle β, which is advantageously between approximately 120° and 180°. The two ends of the connector 80 are not offset relative to one another. The mounting flange 35 and the connection rim also extend parallel to one another. Due to the very large angle β, there results an adequate elasticity of the connector 80 in its longitudinal direction.

The connectors 70 and 80 can also be provided with a structured inner surface in one or in both of the channels. For this purpose, knurlings can be provided that correspond to the knurlings of the connectors 20 and 60.

With both of the connectors 70 and 80, the end edge 44 of the partition 33 is disposed in a plane perpendicular to the longitudinal axis 18 of the cylinder 2. The manufacture of the connectors 70, 80 is effected in the manner described in conjunction with the connectors 20 and 60.

The specification incorporates by reference the disclosure of German priority document 10 2008 006 681.8 filed Jan. 30, 2008.

The present invention is, of course, in no way restricted to the specific disclosure of the specification and drawings, but also encompasses any modifications within the scope of the appended claims.

We claim:

1. An internal combustion engine having a cylinder and a fuel supply mechanism, comprising:

an elastic connector that connects the fuel supply mechanism with the cylinder of said internal combustion engine, wherein said elastic connector is disposed between the fuel supply mechanism and said cylinder, further wherein said elastic connector has a first mixture channel for fuel/air mixture and a second supply channel for combustion air, further wherein said first mixture channel and said second supply channel are guided in said elastic connector as channels that are completely separated from one another, further wherein said first mixture channel opens out at said cylinder via a mixture inlet that is port controlled by a piston of said cylinder, further wherein fuel/air mixture is drawn into a crankcase of the engine through said first mixture channel, further wherein said second supply channel opens out at said cylinder via an air inlet that, in the region of the upper dead center position of said piston, is connected with at least one transfer channel such that scavenging air is supplied to said at least one transfer channel via said second supply channel, further wherein said elastic connector has a first connection end and a second connection end, and wherein said mixture channel and said supply channel open out at said first and second connection ends; and a partition that is disposed in said elastic connector and effects said complete separation of said mixture channel and said supply channel from one another in said elastic connector, wherein said partition extends in a longitudinal direction of said channels, and wherein said partition is twisted about its longitudinal central axis between said first connection end and said second connection end.

2. An internal combustion engine according to claim 1, wherein an end edge of said partition at said first connection end forms an angle of approximately 10° to approximately 180° with an end edge of said partition at said second connection end as viewed perpendicular to a plane of said first connection end.

3. An internal combustion engine according to claim 2, wherein said angle is approximately 25° to approximately 35°.

4. An internal combustion engine according to claim 1, wherein said longitudinal central axis of said partition at said first connection end is provided with a spacing relative to said longitudinal central axis of said partition at said second connection end, further wherein said spacing is measured perpendicular to said longitudinal central axis of said partition in said first connection end and perpendicular to said longitudinal central axis of the cylinder of said internal combustion engine, and wherein said spacing is preferably approximately 2 mm to approximately 15 mm, in particular approximately 4 mm to approximately 10 mm.

5. An internal combustion engine according to claim 1, wherein said first connection end is inclined relative to said second connection end by an angle that is preferably approximately 15° to approximately 60°, in particular approximately 25° to approximately 45°.

6. An internal combustion engine according to claim 5, wherein said angle of inclination between said first and second connection ends opens out toward a side of said connector that faces said mixture channel.

7. An internal combustion engine according to claim 1, wherein said first connection end faces the cylinder, and said second connection end faces the fuel supply mechanism.

8. An internal combustion engine according to claim 7, wherein an end edge of said partition at said first connection end is disposed in a plane that is disposed perpendicular to a longitudinal axis of the cylinder of said internal combustion engine.

9. An internal combustion engine according to claim 8, wherein said first connection end is inclined relative to said longitudinal axis of the cylinder by an angle of approximately 3° to approximately 30°.

10. An internal combustion engine according to claim 9, wherein said angle of inclination between first connection end and said longitudinal axis of the cylinder opens toward a side that faces said mixture channel.

11. An internal combustion engine according to claim 1, wherein at least one of said supply channel and said mixture channel of said elastic connector is provided with a structured inner surface.

12. An internal combustion engine according to claim 11, wherein said structured inner surface includes a plurality of raised portions in the shape of pyramids.

13. An internal combustion engine according to claim 12, wherein said raised portions are provided with side surfaces that are oriented in a longitudinal direction of said channels.

14. An internal combustion engine according to claim 11, wherein both said supply channel and said mixture channel are provided with a structured inner surface.

15. An internal combustion engine according to claim 1, wherein said first connection end is formed on a first mounting flange and said second connection end is formed on a second mounting flange.

\* \* \* \* \*